US011996217B2

(12) United States Patent
Yaguchi et al.

(10) Patent No.: US 11,996,217 B2
(45) Date of Patent: May 28, 2024

(54) SHIELDED CABLE

(71) Applicant: Hitachi Metals, Ltd., Tokyo (JP)

(72) Inventors: Atsuro Yaguchi, Tokyo (JP); Takanobu Watanabe, Tokyo (JP); Takanori Komuro, Tokyo (JP); Kimika Kudo, Tokyo (JP); Koki Hirano, Tokyo (JP); Detian Huang, Tokyo (JP)

(73) Assignee: PROTERIAL, LTD., Tokyo (JP)

( * ) Notice: Subject to any disclaimer, the term of this patent is extended or adjusted under 35 U.S.C. 154(b) by 83 days.

(21) Appl. No.: 17/590,387

(22) Filed: Feb. 1, 2022

(65) Prior Publication Data

US 2022/0246326 A1 Aug. 4, 2022

(30) Foreign Application Priority Data

Feb. 2, 2021 (JP) ................................ 2021-014997
Dec. 24, 2021 (JP) ................................ 2021-211534

(51) Int. Cl.
*H01B 7/42* (2006.01)
*H01B 7/02* (2006.01)
*H01B 7/29* (2006.01)
*H01B 11/18* (2006.01)

(52) U.S. Cl.
CPC ........... *H01B 7/421* (2013.01); *H01B 7/0208* (2013.01); *H01B 7/292* (2013.01); *H01B 11/18* (2013.01)

(58) Field of Classification Search
CPC ...... H01B 7/421; H01B 7/0208; H01B 7/292; H01B 11/18; H01B 9/02
See application file for complete search history.

(56) References Cited

U.S. PATENT DOCUMENTS 4,626,619 A * 12/1986 Uematsu .............. H01B 7/2825 174/106 SC
5,828,007 A 10/1998 Fujishita et al.
2020/0081209 A1* 3/2020 Martin Regalado ... H01B 9/005
2021/0217540 A1* 7/2021 Maioli ................... H01B 9/006
2021/0217542 A1* 7/2021 Chuganey .............. H01B 7/226
2021/0327610 A1* 10/2021 Oishi ................. H01B 11/1821

FOREIGN PATENT DOCUMENTS

JP H08-235939 A 9/1996
JP 2016-065217 A 4/2016

OTHER PUBLICATIONS

Japanese Office Action, dated Nov. 2, 2021, in Japanese Application No. 2021-014997 and English Translation thereof.

* cited by examiner

*Primary Examiner* — Hoa C Nguyen
*Assistant Examiner* — Amol H Patel
(74) *Attorney, Agent, or Firm* — MCGINN I.P. LAW GROUP, PLLC.

(57) ABSTRACT

A shielded cable includes at least one electric wire or cable, a shield being provided around the at least one electric wire or cable and including a plurality of wires comprising a metal material, an insulating coating being provided around the shield in direct- and plane-contact with the plurality of wires. The insulating coating includes a base resin composed of acid-modified fluoropolymer, and a heat-dissipating filler included in the base resin. The heat-dissipating filler is electrically insulating and has at least one functional group of $NH_2$ group and OH group on its surface.

14 Claims, 2 Drawing Sheets

SHIELDED CABLE

CROSS-REFERENCE TO RELATED APPLICATIONS

The present patent application claims the priority of Japanese patent application No. 2021-014997 filed on Feb. 2, 2021 and the priority of Japanese patent application No. 2021-211534 filed on Dec. 24, 2021, and the entire contents thereof are hereby incorporated by reference.

TECHNICAL FIELD

The present invention relates to a shielded cable.

BACKGROUND ART

Conventionally, an electric wire including a core wire of a conductor insulated with an insulating coating (i.e., insulative covering) comprising a heat-dissipating insulating material with high thermal conductivity which is formed of a mixture of vinyl chloride and one or more of silica, alumina, magnesium oxide, boron nitride, and beryllium oxide, has been known (see Patent Literature 1).

According to the electric wire described in the Patent Literature 1, even if electrical current flows through the core wire and heat is generated in the insulating coating, the heat will not be accumulated in the insulating coating comprising the heat-dissipating insulating material and can be dissipated to the outside.

CITATION LIST

Patent Literature

Patent Literature 1: JPH8-235939A

SUMMARY OF THE INVENTION

For cables that require high heat resistance, such as endoscope cables for which disinfection at high temperatures should be performed prior to use and cables to be used in narrow casings or enclosures that are difficult to dissipate heat to outside, such as thin personal computers with a foldable display, it is preferable to use a fluoropolymer (i.e., fluororesin) with excellent heat resistance as a material for insulating coatings such as sheath and jacket.

However, fluoropolymers have poor interaction with fillers, and when heat-dissipating fillers are mixed with the fluoropolymer to increase heat dissipation property, such as the electric wire in the Patent Literature 1, cracks may occur starting at the interface between the fluoropolymer and the fillers that are not bonded to each other, when deformation such as bending or twisting occurs. In other words, by mixing the fluoropolymer with the heat-dissipating fillers, the resistance to mechanical stress is reduced. For this reason, when the fluoropolymer is used in the material for the insulating coatings such as sheath, it was difficult to achieve a balance between excellent heat dissipation property and excellent resistance to mechanical stress.

Therefore, the object of the present invention is to provide a shielded cable with an insulating coating which is excellent in both heat dissipation property and resistance to mechanical stress.

So as to achieve the above object, one aspect of the invention provides: a shielded cable, comprising:

at least one electric wire or cable;

a shield being provided around the at least one electric wire or cable and comprising a plurality of wires comprising a metal material; and an insulating coating being provided around the shield in direct- and plane-contact with the plurality of wires, wherein the insulating coating comprises a base resin comprising an acid-modified fluoropolymer, and a heat-dissipating filler being included in the base resin, the heat-dissipating filler being electrically insulating and having at least one functional group of $NH_2$ group and OH group on its surface.

Effect of the Invention

According to this invention, it is possible to provide a shielded cable with an insulating coating which is excellent in both heat dissipation property and resistance to mechanical stress.

BEST MODE FOR CARRYING OUT THE INVENTION

Embodiment

A shielded cable in an embodiment according to the present invention is a shielded cable with an insulating coating such as sheath and jacket that is excellent in both heat dissipation property and resistance to mechanical stress. As an example of the shielded cable, an endoscope cable with a sheath as insulating coating is described below. However, any shielded cable with an insulating coating having the same features as the sheath described below will be included in the shielded cable in the embodiment according to the present invention.

Figure 1:
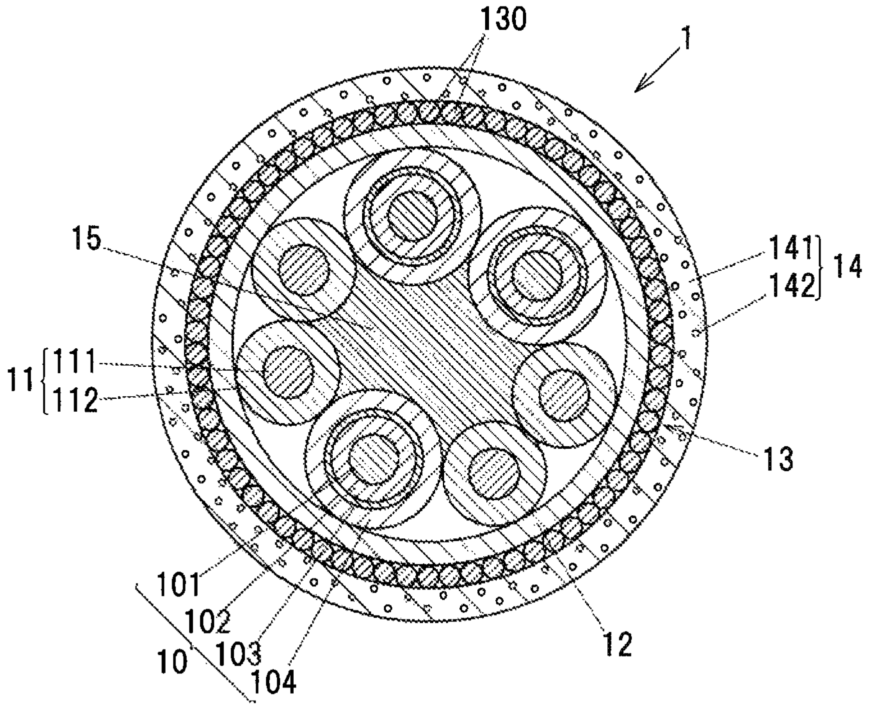
FIG. 1 is a radial cross-sectional view of an endoscope cable which is an example of a shielded cable according to the present invention.

FIG. 1 is a radial cross-sectional view of an endoscope cable 1 which is an example of the shielded cable according to the present invention. The endoscope cable 1, which is a micro (i.e., superfine) coaxial composite cable, houses three coaxial cables 10 and four electric wires 11 therein. These plural coaxial cables 10 and the electric wires 11 are bundled with a binder tape 12. An outer periphery of the binder tape 12 is covered by a shield 13 with electrically conductive property, such as a spiral shield (i.e., serve shield) composed of multiple wires 130 that are spirally wound, or a braided shield composed of multiple wires 130 that are braided. A sheath 14 is provided to cover the shield 13. In order to stabilize the placement of the coaxial cables 10 and the electric wires 11, a filler 15 may be provided at a center of (i.e., a space surrounded by) the coaxial cables 10 and the electric wires 11.

The coaxial cable 10, for example, includes an inner conductor 101, an insulator 102 provided around the inner conductor 101, an outer conductor 103 provided around the insulator 102, and a jacket 104 provided around the outer conductor 103.

The electric wire 11, for example, includes a conductor 111, and an insulator 112 provided around the conductor 111. The shield 13, for example, is a spiral shield including multiple wires 130 composed of a tin (Sn)-containing copper alloy and being spirally wound, and each wire 130 has a diameter of 0.05 mm.

The sheath 14 is composed of a coating resin material including a base resin 141 composed of acid-modified fluoropolymer, and electrically insulating heat-dissipating fillers 142 included in the base resin 141. The sheath 14 is formed by tube extrusion or insertion extrusion. The sheath 14 is in direct- and plane-contact with respective wires 130 of the shield 13.

Figure 2:
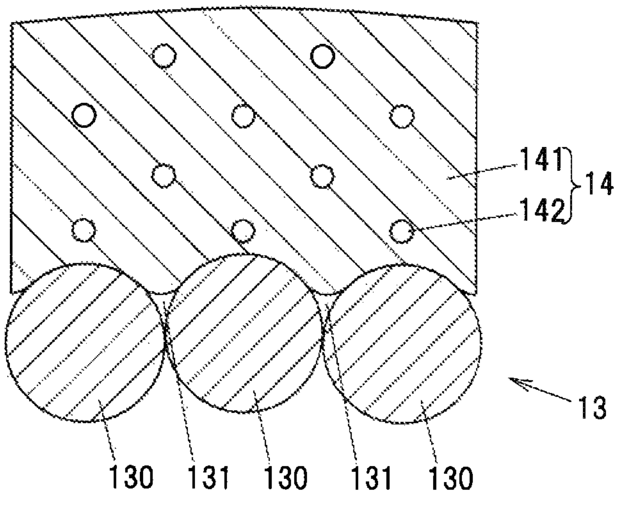
FIG. 2 is a schematic enlarged cross-sectional view of a structure of a contact area between a shield and a sheath in the endoscope cable.

FIG. 2 is a schematic enlarged cross-sectional view of a structure of a contact area between the shield 13 and the sheath 14. As shown in FIG. 2, the sheath 14 enters a recessed space 131 between the wires 130 adjacent to each other. Here, if the sheath 14 is formed by tube extrusion, the sheath 14 enters the space 131 shallowly. If the sheath 14 is formed by insertion extrusion, the sheath enters the space 131 deeper than if it was formed by tube extrusion. As a result of the sheath 14 entering the space 131, the sheath 14 is in plane-contact with the respective wires 130, but not in line-contact.

The acid-modified fluoropolymer constituting the base resin 141 is an acid-modified form of fluoropolymer with excellent heat resistance, including, e.g., acid-modified PFA (Tetrafluoroethylene-Perfluoroalkyl vinyl ether copolymer), ETFE (Tetrafluoroethylene-Ethylene copolymer), and FEP (Tetrafluoroethylene-Hexafluoropropylene copolymer (4-fluoroethylene, 6-fluoropropylene copolymer)). In particular, PFA has excellent heat resistance, insulation and mechanical strength compared to other fluoropolymers. It is therefore preferable to use acid-modified PFA as the base resin 141. Here, acid modification refers to the co-polymerization of acids into a resin (polymerization of acids in the principal chain of the resin) and the binding of acids to the side chains of the resin.

The heat-dissipating filler 142 is a filler with high thermal conductivity, which is mixed with the base resin 141 to improve the heat dissipation property of the sheath 14. In order to effectively improve the heat dissipation property of the sheath 14 by using the heat-dissipating filler 142 while maintaining the resistance to mechanical stress of the sheath 14, a concentration of the heat-dissipating fillers 142 in the sheath 14 is preferably 2 mass % or more and 12 mass % or less. If the concentration of the heat-dissipating fillers 142 is less than 2 mass %, it is difficult to effectively improve the heat dissipation property of the sheath 14. If the concentration of the heat-dissipating fillers 142 exceeds 12 mass %, the resistance to mechanical stress such as repetitive bending property and repetitive twisting property may deteriorate.

The heat-dissipating fillers 142 are electrically insulating because they are included in the sheath 14, which requires high electrical insulation. A major axis of the heat-dissipating filler 142 is preferably 50 nm or more and 1 μm or less from the viewpoint of mechanical properties. If the major axis of the heat-dissipating filler 142 exceeds 1 μm, even though the number of interfaces between the heat-dissipating fillers 142 and the base resin 141 is small, an area of each interface will be large, so that the interface will be easier to act as a starting point for a fracture due to stress concentration. On the other hand, if the major axis of the heat-dissipating filler 142 is less than 50 nm, coarse particles generated by the particle aggregation of the heat-dissipating fillers 142 may act as the starting point of the fracture.

The heat-dissipating filler includes, e.g., boron nitride (BN) fillers, aluminum nitride (AlN) fillers, silicon carbide (SiC) fillers, zinc oxide (ZnO) fillers, alumina ($Al_2O_3$) fillers, and the like, and these surfaces have $NH_2$ groups or OH groups.

For example, the heat-dissipating fillers 142 may be composed of one or more of boron nitride fillers, aluminum nitride fillers, silicon carbide fillers, zinc oxide fillers, and alumina fillers.

In the sheath 14, C═O group (carbonyl group) in the acid of the acid-modified fluoropolymer constituting the base resin 141 reacts with $NH_2$ group or OH group on the surface of the heat-dissipating filler 142, thereby expressing the adhesion of the interface between the base resin 141 and the heat-dissipating filler 142. Therefore, even if the deformation of the endoscope cable 1 causes mechanical stress, such as bending or twisting, on the sheath 14, it will be possible to suppress the formation of a gap resulting in the starting point of the crack at the interface between the base resin 141 and the heat-dissipating filler 142. In other words, the sheath 14 has excellent resistance to mechanical stress while exhibiting excellent heat dissipation property because of heat-dissipation fillers 142.

More specifically, $NH_2$ group on the surface of the heat-dissipating reacts with carbonyl group in the acid of the acid-modified fluoropolymer constituting the base resin 141 to form amide (amide reaction: —COOH+—$NH_2$═—CONH—+$H_2O$) to express the adhesion at the interface between the base resin 141 and the heat-dissipating filler 142. In addition, OH group on the surface of the heat-dissipating filler 142 reacts with the carbonyl group in the acid of the acid-modified fluoropolymer constituting the base resin 141 to form a hydrogen bond to express the adhesion at the interface between the base resin 141 and the heat-dissipating filler 142.

The adhesion expressed by the reaction of $NH_2$ groups and carbonyl groups is stronger than that expressed by the reaction of OH groups and carbonyl groups. For this reason, it is particularly preferable to use at least one of boron nitride filler and aluminum nitride filler, which is a nitride filler with $NH_2$ groups on the surface, for the heat-dissipating filler 142. It is more preferable to use boron nitride fillers as the heat-dissipating filler 142, because boron nitride fillers have excellent moisture resistance than aluminum nitride fillers.

Also, since the shield 13 is composed of a metal material, there are a considerable number of OH groups on its surface. Therefore, when the sheath 14 is extrusion molded, the OH groups on the surface of the shield 13 react with carbonyl groups in the acid-modified fluoropolymer constituting the base resin 141 to form hydrogen bonds. This improves the adhesion at the interface between the shield 13 and the sheath 14. In addition, by entering the sheath 14 into the recessed space 131 between the adjacent wires 130, the contact area between the shield 13 and the sheath 14 is increased, so that the adhesion between the shield 13 and the sheath 14 is increased. The strong adhesion between the shield 13 and the sheath 14 reduces the mechanical stress due to misalignment and movement of the wires 130 constituting the shield 13, when the endoscope cable 1 is deformed, such as bending or twisting. This suppresses breaking of the wire 130, fracture of the sheath 14, or crashing of the sheath 14 by the wire 130 breaking therethrough.

In the endoscope cable 1, the jacket 104, which is an insulating coating for the coaxial cable 10, and the insulator 112, which is an insulating coating for the electric wire 11, may be composed of a coating resin material including a base resin 141 and heat-dissipating fillers 142, similarly to the sheath 14.

Effect of the Embodiment

According to the above embodiment, it is possible to provide a coating resin material excellent in both heat dissipation property and resistance to mechanical stress, which includes a base resin composed of acid-modified fluoropolymer, and an insulating heat-dissipating filler with at least one functional group of $NH_2$ group and OH group on its surface.

By using the coating resin material as the material for the insulating coating such as sheath and jacket, it is possible to provide the shielded cable with an insulating coating excellent in both heat dissipation property and resistance to mechanical stress. Such a shielded cable is suitable for use as a shielded that requires an insulating coating with both high heat dissipation property and high resistance to mechanical stress, such as endoscope cables for which disinfection at high temperatures should be performed prior to use and cables to be used in narrow casings or enclosures that are difficult to dissipate heat to outside, such as thin personal computers with a foldable display.

Example 1

As an example of a shielded cable according to the present invention, a composite 10-core cable was formed and the tensile properties and heat transfer property (heat dissipation property) of a sheath as an insulating coating and the bending properties of the cable were evaluated.

(Composite 10-Core Cable Configuration)

The composite 10-core cable in this example includes two 44AWG coaxial cables, two 42AWG coaxial cables, and six 36AWG electric wires, which are twisted together and bundled by a binder tape with a thickness of about 0.05 mm, and an outer periphery of the binder tape is covered by a shield with a thickness of about 0.05 mm. The shield is a spiral (serve) shield composed of seventy silver-plated copper alloy wires each with a diameter of 0.05 mm. Further, a sheath with a thickness of about 0.10 mm and an outer diameter of about 1.5 mm is provided to cover the shield.

The 44AWG coaxial cable has an outer diameter of about 0.26 mm, and includes an inner conductor being composed of seven twisted conductor wires each with a diameter of about 0.02 mm, an insulator with a thickness of about 0.05 mm being provided around the inner conductor, an outer conductor with a thickness of about 0.025 mm being provided around the insulator, and a jacket with a thickness of about 0.03 mm being provided around the outer conductor.

The 42AWG coaxial cable has an outer diameter of about 0.29 mm, and includes an inner conductor being composed of seven twisted conductor wires each with a diameter of about 0.025 mm, an insulator with a thickness of about 0.05 mm being provided around the inner conductor, an outer conductor with a thickness of about 0.025 mm being provided around the insulator, and a jacket with a thickness of about 0.03 mm being provided around the outer conductor.

The 36AWG coaxial cable has an outer diameter of about 0.25 mm, and includes an inner conductor being composed of nineteen twisted conductor wires each with a diameter of about 0.03 mm, and an insulator with a thickness of about 0.05 mm being provided around the inner conductor.

In this example, three types of composite 10-core cables with different sheath configurations (Hereinafter respectively referred to as Example 1, Comparative example 1, and Comparative example 2) were prepared and evaluated. The configurations of the members other than the sheath of Example 1, Comparative example 1, and Comparative example 2 are common, as described above. The configuration of each sheath for Example 1, Comparative example 1, and Comparative example 2 are shown in Table 1 below.

TABLE 1

| | | Comparative example 1 | Comparative example 2 | Example 1 |
|---|---|---|---|---|
| Base resin | PFA (AP-201) | 100 | 0 | 0 |
| | PFA (AP-202) | 0 | 90 | 0 |
| | Acid-modified PFA (EA-2000) | 0 | 0 | 90 |
| Heat-dissipating filler | Boron nitride filler | 0 | 10 | 10 |

The values in Table 1 indicate the concentration (mass %) of each material in the sheath. In Table 1, "AP-201" is a Neoflon AP-201 manufactured by Daikin Industries, Ltd., and "AP-202" is a Neoflon AP-202 manufactured by Daikin Industries, Ltd. "EA-2000" is a Fluon+EA-2000 manufactured by AGC Inc.

Of Example 1, Comparative example 1, and Comparative Example 2, Example 1 including acid-modified fluoropolymer as the base resin and boron nitride filler as the heat-dissipating filler is a coating resin material in the embodiment of the present invention.

(Evaluation Method)

The tensile properties were evaluated by removing components other than sheath from the composite 10-core cable (Example 1, Comparative example 1, and Comparative example 2) of the finished product and performing a tensile test on the sheath alone. The tensile strength at break (i.e., breaking strength) and elongation at break (i.e., breaking elongation) were evaluated by testing under the conditions of a mark-to-mark distance of 50 mm and a tensile rate of 20 mm/min.

The evaluation of sheath thermal conductivity was carried out by preparing a sheet-shape sample of the sheath material and measuring the thermal conductivity in accordance with ISO22007-2.

The bending property was evaluated by a bending test. The bending test was performed by hanging a weight of 100 g on one end of the composite 10-core cable (Example 1, Comparative example 1, and Comparative example 2), and bending (flexing) the composite 10-core cable to the left and right at 90 degrees or more along a pulley with a radius of 7.5 mm installed in a testing device. In this bending test, the bending was performed at a speed of 30 times per minute, and the appearance of the composite 10-core cable was observed every 10,000 bending times. The bending was continued up to 200,000 times.

(Evaluation Result)

For Example 1, Comparative example 1, and Comparative example 2, the results of the evaluation of the tensile properties and the heat transfer property (i.e., heat dissipation property) of the sheath and the bending property of the cable are shown in Table 2 below.

TABLE 2

| | | Comparative example 1 | Comparative example 2 | Example 1 |
|---|---|---|---|---|
| Tensile properties | Breaking strength [N] | 13.6 | 9.5 | 12.0 |
| | Breaking elongation [%] | 300 | 310 | 170 |
| Heat property | Thermal conductivity [W/mK] | 0.25 | 0.40 | 0.39 |
| Bending property | Number of bending times at sheath breaking | 200,000 times or more | 10,000 to 20,000 times | 200,000 times or more |

The heat transfer property of the sheath in Example 1 and Comparative example 2 is similar to each other and they are superior to Comparative example 1. This is thought to be due to the fact that heat-dissipating fillers are included in Example 1 and Comparative example 2, and not included in Comparative example 1.

For the tensile properties of the sheath, the breaking strength in Comparative example 2 was smaller than the breaking strength in Comparative example 1. This is thought to be due to the fact that the crack started from the gap at the interface between the base resin and the heat-dissipating filler because the Comparative example 2 includes heat-dissipating fillers. On the other hand, even though Example 1 includes the heat-dissipating fillers, the difference in breaking strength between Example 1 and Comparative example 1 is not as large as the difference in breaking strength between Example 1 and Comparative example 2. This is thought to be due to the fact that the interface between the base resin and the heat-dissipating filler is highly bonded because the base resin in Example 1 is composed of acid-modified fluoropolymer, thereby causing stress on the interface and reducing the gap that is the starting point of the crack. The breaking elongation in Example 1 was smaller than the breaking elongations in Comparative example 1 and Comparative example 2. This is thought to be due to the increased binding on the interface between the base resin and the heat-dissipating filler in Example 1. However, the reduction in the breaking elongation in Example 1 is considered to be practically acceptable level.

The evaluation result of the bending property of the cable was similar to the evaluation result of the tensile properties of the sheath. This is thought to be due to the same reason as the tensile properties of the sheath. In other words, the number of bending times at sheath breaking in Comparative example 2 (the number of cable bends when the sheath breaks) was less than the number of bending times at sheath breaking in Comparative example 1. This is thought to be due to the fact that the crack started from the gap at the interface between the base resin and the heat-dissipating filler because the Comparative example 2 includes heat-dissipating fillers. In addition, even though Example 1 included heat-dissipating fillers, the number of bending times at sheath breaking was similar to that of Comparative example 1. This is thought to be due to the fact that the interface between the base resin and the heat-dissipating filler is highly bonded because the base resin in Example 1 is composed of acid-modified fluoropolymer, thereby causing stress on the interface and reducing the gap that is the starting point of the crack, that the interface between the base resin and the shield is highly bonded because the base resin in Example 1 is composed of acid-modified fluoropolymer, and that the adhesion between the shield and the sheath is improved by the sheath entering the recessed space between the wires constituting the shield, thereby suppressing the mechanical stress caused by the misalignment or movement of the wires constituting the shield.

As noted above, Comparative example 1 had excellent tensile and bending properties, but it was inferior in thermal conductivity. In contrast, Comparative example 2 had excellent heat transfer properties, but it had poor tensile and bending properties. Of Example 1, Comparative Example 1, and Comparative Example 2, only example 1 had excellent tensile and bending properties as well as heat transfer properties, i.e., excellent sheath in both heat dissipation properties and resistance to mechanical stress.

Example 2

As an example of a shielded cable according to the present invention, a composite 12-core cable was formed and the tensile properties and heat transfer property (heat dissipation property) of a sheath as an insulating coating and the bending properties and torsional property of the cable were evaluated.

(Composite 12-Core Cable Configuration)

The composite 12-core cable in this example includes two 44AWG coaxial cables, six 40AWG coaxial cables, two 36AWG electric wires, and two 32AWG electric wires, which are twisted together and bundled by a binder tape with a thickness of about 0.01 mm, and an outer periphery of the binder tape is covered by a shield with a thickness of about 0.05 mm. The shield is a spiral (serve) shield composed of eighty silver-plated copper alloy wires each with a diameter of 0.05 mm. Further, a sheath with a thickness of about 0.1 mm and an outer diameter of about 1.6 mm is provided to cover the shield.

The 44AWG coaxial cable has an outer diameter of about 0.25 mm, and includes an inner conductor being composed of seven twisted conductor wires each with a diameter of about 0.02 mm, an insulator with a thickness of about 0.05 mm being provided around the inner conductor, an outer conductor with a thickness of about 0.02 mm being provided around the insulator, and a jacket with a thickness of about 0.02 mm being provided around the outer conductor.

The 40AWG coaxial cable has an outer diameter of about 0.36 mm, and includes an inner conductor being composed of seven twisted conductor wires each with a diameter of about 0.03 mm, an insulator with a thickness of about 0.075 mm being provided around the inner conductor, an outer conductor with a thickness of about 0.03 mm being provided around the insulator, and a jacket with a thickness of about 0.03 mm being provided around the outer conductor.

The 36AWG coaxial cable has an outer diameter of about 0.23 mm, and includes an inner conductor being composed of nineteen twisted conductor wires each with a diameter of about 0.03 mm, and an insulator with a thickness of about 0.04 mm being provided around the inner conductor.

The 32AWG coaxial cable has an outer diameter of about 0.35 mm, and includes an inner conductor being composed of nineteen twisted conductor wires each with a diameter of about 0.05 mm, and an insulator with a thickness of about 0.05 mm being provided around the inner conductor.

In this example, the composite 12-core cable, which includes heat-dissipating fillers in the sheath (Hereinafter referred to as Example 2), and the composite 12-core cable, which does not include heat-dissipating fillers in the sheath (Hereinafter referred to as Comparative example 3), were prepared and evaluated. The sheath in Example 2 includes 96 mass % of acid-modified PFA (Fluon+EA-2000) as the base resin, and 4 mass % of boron nitride filler as the heat-dissipating filler. The sheath in Comparative example 3 is consisted of PFA (Neoflon AP-201).

(Evaluation Method)

The tensile properties were evaluated by removing components other than sheath from the composite 12-core cable (Example 2 and Comparative example 3) of the finished product and performing a tensile test on the sheath alone. The tensile strength at break (i.e., breaking strength) and elongation at break (i.e., breaking elongation) were evaluated by testing under the conditions of a mark-to-mark distance of 50 mm and a tensile rate of 20 mm/min.

The evaluation of sheath thermal conductivity was carried out by preparing a sheet-shape sample of the sheath material and measuring the thermal conductivity in accordance with ISO22007-2.

The bending property was evaluated by a bending test. The bending test was performed by hanging a weight of 100 g on one end of the composite 12-core cable (Example 2 and Comparative example 3), and bending (flexing) the composite 12-core cable the left and right at 90 degrees or more along a pulley with a radius of 7.5 mm installed in a testing device. In this bending test, the bending was performed at a speed of 30 times per minute, and the appearance of the composite 12-core cable was observed every 10,000 bending times. The bending was continued up to 200,000 times for Example 2, and up to 150,000 times for Comparative example 3.

The torsional property was evaluated by a torsion test. The torsion test was performed by hanging a weight of 150 g on one end of the composite 12-core cable (Example 2 and Comparative example 3), installing it on a testing device, and twisting it at least 180 degrees to the left and right over a length of 200 mm. In this torsion test, the appearance of the composite 12-core cable was observed every 10,000 twists, and torsional cycles (i.e., twists) were continued up to 200,000 times for Example 2, and up to 150,000 times for Comparative example 3.

(Evaluation Result)

For Example 2 and Comparative example 3, the results of the evaluation of the tensile properties and heat transfer property (heat dissipation property) of the sheath, and the bending property and torsional property of the cable are shown in Table 3 below.

TABLE 3

| | | Comparative example 3 | Example 2 |
|---|---|---|---|
| Tensile properties | Breaking strength [N] | 11.3 | 13.4 |
| | Breaking elongation [%] | 280 | 220 |
| Heat transfer property | Thermal conductivity [W/mK] | 0.25 | 0.31 |
| Bending property | Number of bending times at sheath breaking | 150,000 times or more | 200,000 times or more |
| Torsional property | Number of bending times at sheath breaking | 150,000 times or more | 200,000 times or more |

The heat transfer property of the sheath for Example 2 was superior to Comparative example 3. This is thought to be due to the fact that heat-dissipating fillers are included in Example 2, and not included in Comparative example 3.

For the tensile properties of the sheath, although the tensile properties of the sheath in Example 2 includes heat-dissipating fillers, the breaking strength of Example 2 was similar to that of Comparative example 3, and the breaking elongation of Example 2 was not comparable to that of Comparative example 3, but the difference therebetween was practically acceptable. This is thought to be due to the fact that the interface between the base resin and the heat-dissipating filler is highly bonded because the base resin in Example 2 is composed of acid-modified fluoropolymer, thereby causing stress on the interface and reducing the gap that is the starting point of the crack.

For the bending property and the torsional property of the cable, although the tensile properties of the sheath in Example 2 includes heat-dissipating fillers, the evaluation result of Example 2 was similar to that of Comparative Example 3. This is thought to be due to the fact that the interface between the base resin and the heat-dissipating filler is highly bonded because the base resin in Example 2 is composed of acid-modified fluoropolymer, thereby causing stress on the interface and reducing the gap that is the starting point of the crack, that the interface between the base resin and the shield is highly bonded because the base resin in Example 2 is composed of acid-modified fluoropolymer, and that the adhesion between the shield and the sheath is improved by the sheath entering the recessed space between the wires constituting the shield, thereby suppressing the mechanical stress caused by the misalignment or movement of the wires constituting the shield.

As noted above, it was confirmed that Example 2 has excellent tensile, bending, and torsional properties as well as heat transfer property, namely Example 2 has a sheath excellent in both heat dissipation and resistance to mechanical stress.

Summary of the Embodiment

Technical ideas understood from the embodiment will be described below citing the reference signs, etc., used for the embodiment. However, each reference sign described below is not intended to limit the constituent elements in the claims to the members, etc., specifically described in the embodiment.

[1] A shielded cable (1) comprising:
at least one electric wire (11) or cable (10);
a shield (13) being provided around the at least one electric wire (11) or cable (10) and comprising a plurality of wires (130) comprising a metal material; and
an insulating coating (14) being provided around the shield (13) in direct- and plane-contact with the plurality of wires (130),
wherein the insulating coating (14) comprises a base resin (141) comprising an acid-modified fluoropolymer, and a heat-dissipating filler (142) and being included in the base resin (141), the heat-dissipating filler (142) being electrically insulating and having at least one functional group of $NH_2$ group and OH group on its surface.

[2] The shielded cable (1) as described in [1], wherein the heat-dissipating filler (142) is composed of one or more of a boron nitride filler, an aluminum nitride filler, a silicon carbide filler, a zinc oxide filler, and an alumina filler.

[3] The shielded cable (1) as described in [2], wherein the heat-dissipating filler (142) is composed of the boron nitride filler and/or the aluminum nitride filler.

[4] The shielded cable (1) as described in any one of [1] to [3], wherein the acid-modified fluoropolymer is an acid-modified PFA, ETFE, or FEP.

[5] The shielded cable (1) as described in [1], wherein the acid-modified fluoropolymer is an acid-modified PFA and the heat-dissipating filler (142) is a boron nitride filler.

[6] The shielded cable (1) as described in any one of [1] to [5], wherein a concentration of the heat-dissipating filler (142) in the insulating coating (14) is 2 mass % or more and 12 mass % or less.

[7] The shielded cable (1) as described in any one of [1] to [6], wherein a major axis of the heat-dissipating filler (142) is 50 nm or more and 1 μm or less.

[8] The shielded cable (1) as described in any one of [1] to [7], wherein the insulating coating (14) enters a recessed space (131) between the wires (130) adjacent to each other.

[9] The shielded cable (1) as described in any one of [1] to [8], wherein the at least one electric wire (11) or cable (10) comprises two or more electric wires (11) and/or cables (10) in total.

Although the embodiment and examples of the invention has been described above, the invention is not to be limited to the embodiment and examples described above, and the invention can be appropriately modified and implemented in various ways without departing from the gist thereof. In addition, the embodiment and examples described above do not limit the inventions according to claims. Further, please note that not all combinations of the features described in the embodiment and examples are necessary to solve the problem of the invention.

The invention claimed is:

1. A shielded cable, comprising:

at least one electric wire or cable;

a shield being provided around the at least one electric wire or cable and comprising a plurality of wires comprising a metal material;

an insulating coating being provided around the shield in direct- and plane-contact with the plurality of wires; and a recessed space being provided between the insulating coating and the wires adjacent to each other, wherein the insulating coating comprises a base resin comprising an acid-modified fluoropolymer, and a heat-dissipating filler being included in the base resin, the heat-dissipating filler being electrically insulating and having at least one functional group of NH2 group and OH group on its surface, and wherein the insulating coating enters the recessed space between the wires adjacent to each other.

2. The shielded cable according to claim 1, wherein the heat-dissipating filler is composed of one or more of a boron nitride filler, an aluminum nitride filler, a silicon carbide filler, a zinc oxide filler, and an alumina filler.

3. The shielded cable according to claim 2, wherein the heat-dissipating filler is composed of the boron nitride filler and/or the aluminum nitride filler.

4. The shielded cable according to claim 1, wherein the acid-modified fluoropolymer is an acid-modified PFA, ETFE, or FEP.

5. The shielded cable according to claim 1, wherein the acid-modified fluoropolymer is an acid-modified PFA and the heat-dissipating filler is a boron nitride filler.

6. The shielded cable according to claim 1, wherein a concentration of the heat-dissipating filler in the insulating coating is 2 mass % or more and 12 mass % or less.

7. The shielded cable according to claim 1, wherein a major axis of the heat-dissipating filler is 50 nm or more and 1 μm or less.

8. The shielded cable according to claim 1, wherein the at least one electric wire or cable comprises two or more electric wires and/or cables in total.

9. The shielded cable according to claim 8, wherein the two or more electric wires and/or cables includes an insulator.

10. The shielded cable according to claim 1, wherein the wires adjacent to each other are in contact with each other.

11. The shielded cable according to claim 1, wherein the shield is a spiral shield including the wires being spirally wound.

12. A shielded cable, comprising:

at least one electric wire or cable;

a shield being provided around the at least one electric wire or cable and comprising a plurality of wires comprising a metal material;

an insulating coating being provided around the shield; and a recessed space being provided between the insulating coating and the wires adjacent to each other, wherein the insulating coating comprises a base resin comprising an acid-modified fluoropolymer, and a heat-dissipating filler being included in the base resin, the heat-dissipating filler being electrically insulating and having at least one functional group of NH2 group and OH group on its surface, wherein the wires adjacent to each other are in contact with each other, and wherein the insulating coating enters the recessed space between the wires adjacent to each other.

13. The shielded cable according to claim 12, wherein the shield is a spiral shield including the wires being spirally wound.

14. The shielded cable according to claim 12, wherein the at least one electric wire or cable comprises two or more electric wires and/or cables in total, and wherein the two or more electric wires and/or cables includes an insulator.

* * * * *